(12) United States Patent
Kwon et al.

(10) Patent No.: US 8,530,071 B2
(45) Date of Patent: Sep. 10, 2013

(54) SECONDARY BATTERY HAVING IMPROVED FLEXIBILITY

(75) Inventors: Moonseok Kwon, Hwaseong-si (KR); Hansu Kim, Seoul (KR); Jaeman Choi, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 522 days.

(21) Appl. No.: 12/264,313

(22) Filed: Nov. 4, 2008

(65) Prior Publication Data

US 2009/0325066 A1 Dec. 31, 2009

(30) Foreign Application Priority Data

Jun. 25, 2008 (KR) .................. 10-2008-0060234

(51) Int. Cl.
H01M 10/00 (2006.01)
H01M 6/00 (2006.01)
H01M 6/40 (2006.01)
H01M 4/13 (2006.01)
H01M 4/02 (2006.01)
H01M 4/64 (2006.01)
H01M 4/74 (2006.01)

(52) U.S. Cl.
USPC ........... 429/122; 429/124; 429/209; 429/233; 429/241

(58) Field of Classification Search
USPC ................. 429/122, 124, 209, 233, 241
See application file for complete search history.

(56) References Cited

U.S. PATENT DOCUMENTS

| 3,833,427 | A | * | 9/1974 | Land et al. | 429/153 |
|---|---|---|---|---|---|
| 5,338,625 | A | | 8/1994 | Bates et al. | |
| 5,693,105 | A | * | 12/1997 | Kawakami | 29/623.2 |
| 5,705,297 | A | * | 1/1998 | Warren | 429/244 |
| 6,379,835 | B1 | * | 4/2002 | Kucherovsky et al. | 429/118 |
| 6,752,842 | B2 | | 6/2004 | Luski et al. | |
| 7,348,096 | B2 | * | 3/2008 | Schubert et al. | 429/127 |
| 2007/0015061 | A1 | | 1/2007 | Klaassen | |
| 2007/0128504 | A1 | * | 6/2007 | Horiuchi et al. | 429/44 |

FOREIGN PATENT DOCUMENTS

| JP | 07-037606 | 2/1995 |
|---|---|---|
| JP | 11-297331 | 10/1999 |
| JP | 2004-253243 | 9/2004 |
| JP | 2005-339825 | 12/2005 |
| JP | 2006-172915 | 6/2006 |

* cited by examiner

Primary Examiner — Helen O Conley
(74) Attorney, Agent, or Firm — Stein IP, LLC

(57) ABSTRACT

A secondary battery with improved flexibility. The secondary battery includes: a substrate; a first electrode collector integrally formed with the substrate as one body; a first electrode material mixture layer; an electrolyte layer; a second electrode material mixture layer; and a second electrode collector having a metallic mesh structure integrally formed with the second electrode material mixture layer as one body, wherein the first electrode material mixture layer, the electrolyte layer, and the second electrode material mixture layer are sequentially formed on the first electrode collector in this order.

9 Claims, 3 Drawing Sheets

SECONDARY BATTERY HAVING IMPROVED FLEXIBILITY

CROSS-REFERENCE TO RELATED APPLICATION

This application claims the benefit of Korean Patent Application No. 2008-60234, filed Jun. 25, 2008, in the Korean Intellectual Property Office, the disclosure of which is incorporated herein by reference.

BACKGROUND OF THE INVENTION

1. Field of the Invention

Aspects of the present invention relate to a secondary battery repeatedly performing a cycle of charging and discharging, and more particularly, to a secondary battery with improved flexibility.

2. Description of the Related Art

Secondary batteries, which are also referred to as storage batteries, are devices that repeatedly perform a cycle of charging and discharging by transferring charges between a cathode and an anode, through an electrolyte. Meanwhile, as demands for small, lightweight electronic devices are increasing, thin, and flexible secondary batteries for those electronic devices are being developed.

If secondary batteries having insufficient flexibility are bent, stress is focused on the electrolyte, between the anode and the cathode, and exfoliation occurs. As a result, the secondary batteries' performance and lifetime are degraded. Accordingly, if flexibility of secondary batteries is sufficiently high, stable battery performance can be obtained and small, lightweight electronic devices can be easily manufactured.

SUMMARY OF THE INVENTION

Aspects of the present invention provide a secondary battery.

According to an aspect of the present invention, there is provided a secondary battery including: a substrate; a first electrode collector integrally formed with the substrate as one body; a first electrode material mixture layer; an electrolyte layer; a second electrode material mixture layer; and a second electrode collector having a metallic mesh structure integrally formed with the second electrode material mixture layer as one body, wherein the first electrode material mixture layer, the electrolyte layer, and the second electrode material mixture layer are sequentially formed on the first electrode collector in this order.

The second electrode collector may be buried in the second electrode material mixture layer using a thermal pressing process so that the second electrode collector and the second electrode material mixture layer are integrally formed as one body.

The secondary battery may further include: a binder layer formed on the second electrode collector using a printing process, so that the second electrode material mixture layer and the second electrode collector are integrally formed as one body, wherein the binder exists in a solid state and fills openings of the second electrode collector. The binder layer may include a conductive agent.

After the second electrode collector is disposed on the second electrode material mixture layer, the binder layer may be formed on the second electrode collector by using the printing process, thereby integrally forming the second electrode material mixture layer and the second electrode collector as one body. Alternatively, after a portion of the second electrode collector is buried in the second electrode material mixture layer by using a thermal pressing process, the binder layer may be formed on the second electrode collector by using the printing process, thereby integrally forming the second electrode material mixture layer and the second electrode collector as one body.

The second electrode collector may include a metal selected from the group consisting of copper, stainless steel, titanium, and nickel. The thickness of the second electrode collector may range from 200 nm to 100 μm, the aperture ratio of the second electrode collector may range from 1% to 99%, and an average pitch of openings of the second electrode collector may be 5 mm or less.

The electrolyte layer may include 0.5 wt % to 20 wt % of a binder material. The secondary battery may further include an encapsulation layer formed on the second electrode collector.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
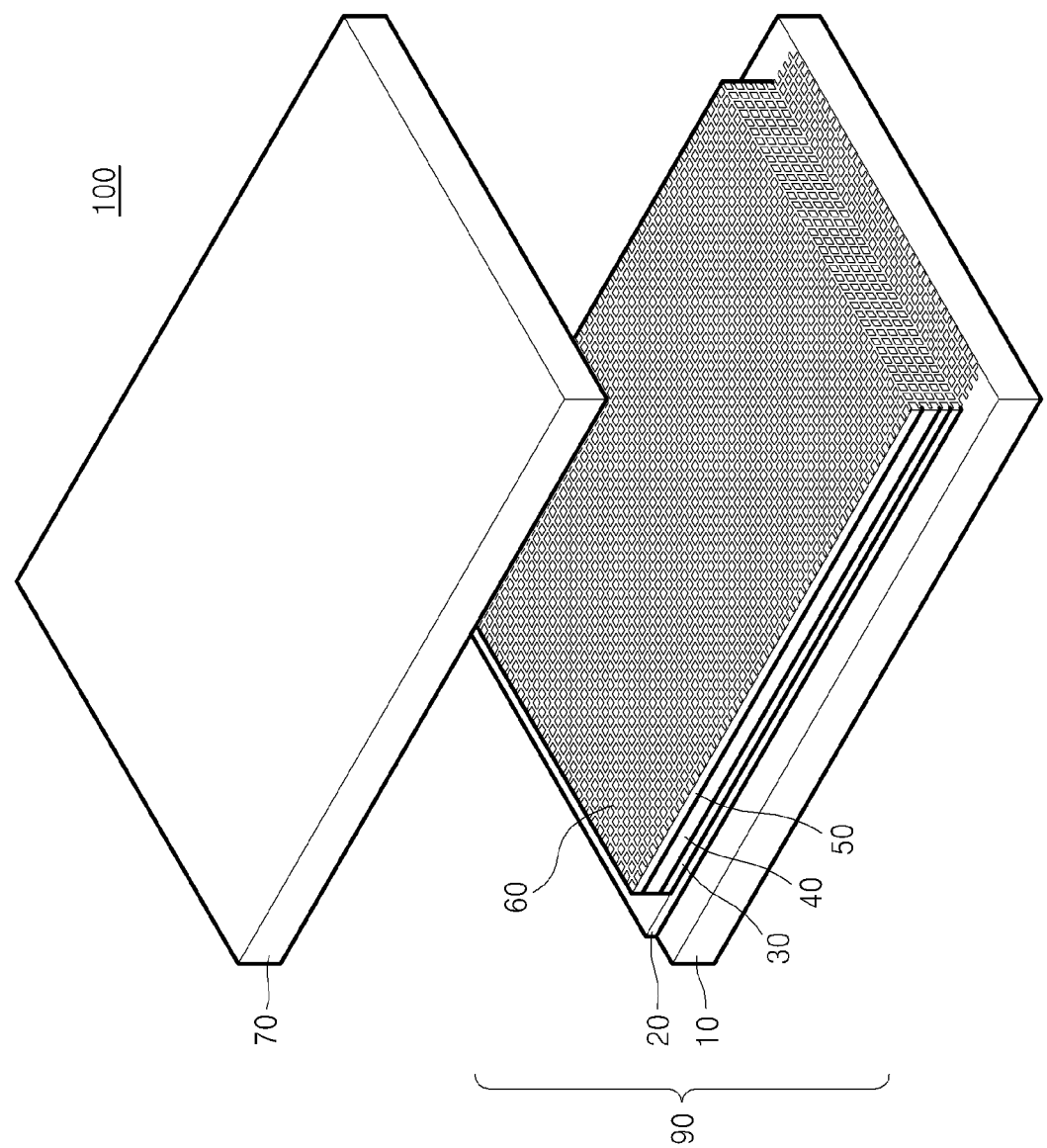
FIG. 1 is a perspective view illustrating a secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

As referred to herein, when a first element is said to be disposed or formed "on", or "adjacent" to, a second element, the first element can directly contact the second element, or can be separated from the second element by one or more other elements located therebetween. In contrast, when an element is referred to as being disposed or formed "directly on" another element, there are no intervening elements present. As used herein, the term "and/or" includes any and all combinations of one or more of the associated listed items.

FIG. 1 is a perspective view illustrating a secondary battery 100 according to an embodiment of the present invention.

Referring to FIG. 1, the secondary battery 100, according to the current embodiment, includes a substrate 10, a first electrode collector 20, a first electrode material mixture layer 30, an electrolyte layer 40, a second electrode material mixture layer 50, and a second electrode collector 60, which are sequentially disposed in the stated order and integrally formed as one body; and an encapsulation layer 70 covering the integrally formed single-body structure. That is, the substrate 10, the first electrode collector 20, the first electrode material mixture layer 30, the electrolyte layer 40, the second electrode material mixture layer 50, and the second electrode collector 60 are integrally formed as one body to form a primary part 90 of the secondary battery 100 and the primary part 90 is covered by the encapsulation layer 70. Accordingly, when a bending stress is applied to the secondary battery, layers of the primary part 90 may not be separated from each other. That is, when a bending stress is applied to the secondary battery 100, only the encapsulation layer 70 may be separated from the primary part 90.

The substrate 10 may be formed of a flexible plastic material, and the first electrode collector 20 is strongly attached thereto. In the current specification, the term "first electrode" refers to one of either a cathode or an anode, and the term "second electrode" refers to the other electrode. For example, if the first electrode is an anode, the second electrode is a cathode. The term "material mixture layer" refers to a layer formed of a mixture including an electrode active material such as lithium, a conductive agent, and a binder The first electrode material mixture layer 30, the electrolyte layer 40, and the second electrode material mixture layer 50 are sequentially formed in the stated order by printing. That is, instead of forming each layer individually and then laminating the formed layer, each layer is formed by printing. By doing so, a very thin laminate structure, in which adjacent layers are strongly attached to each other, can be manufactured and thus, flexibility of the secondary battery 100 can be improved. In addition, circuit connection structures for applying and collecting an electric current can also be formed by printing, and thus, a separate circuit connection process is not needed later.

Then, the second electrode collector 60 is deposited on the second electrode material mixture layer 50. The second electrode collector 60 may be a metallic mesh structure having a plurality of openings. The metallic mesh structure may be formed of, for example, copper, stainless steel, titanium, or nickel. The second electrode collector 60 is bonded to the second electrode material mixture layer 50 through the openings of the metallic mesh structure, and thus the second electrode material mixture layer 50 and the second electrode collector 60 may be highly integrally formed as one body.

Figure 2A:
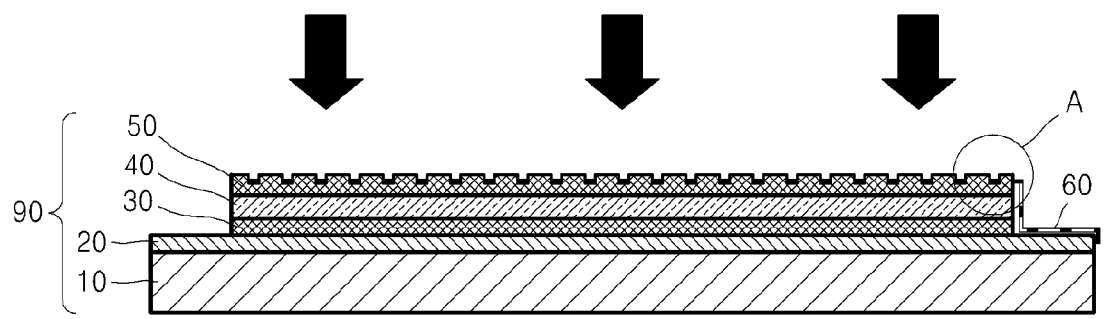
FIG. 2A is a cross-sectional view for explaining a method of forming a second electrode collector in the secondary battery of FIG. 1, according to an embodiment of the present invention.
Figure 2B:
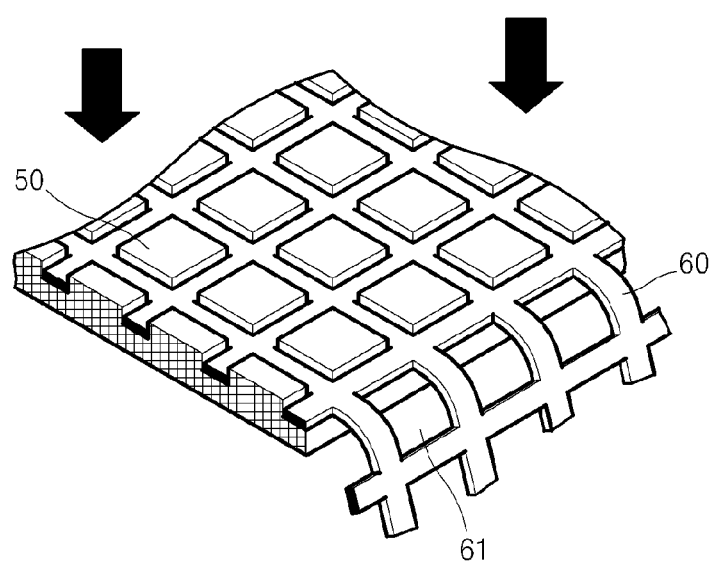
FIG. 2B is a perspective, enlarged view of a portion A of FIG. 2A.
Figure 3:
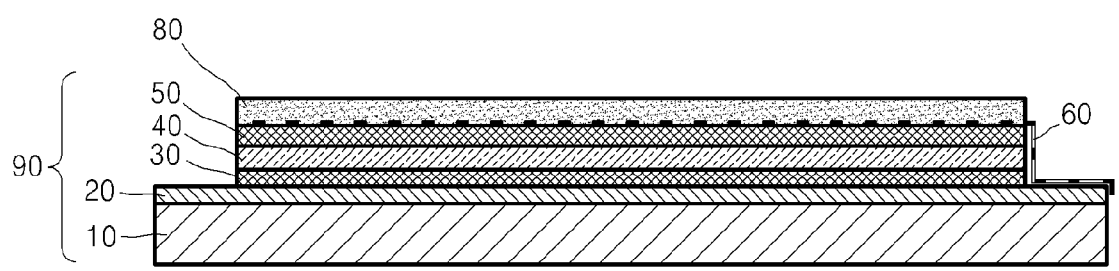
FIGS. 3 and 4 are cross-sectional views for explaining methods of forming a second electrode collector in the secondary battery of FIG. 1, according to other embodiments of the present invention.
Figure 4:
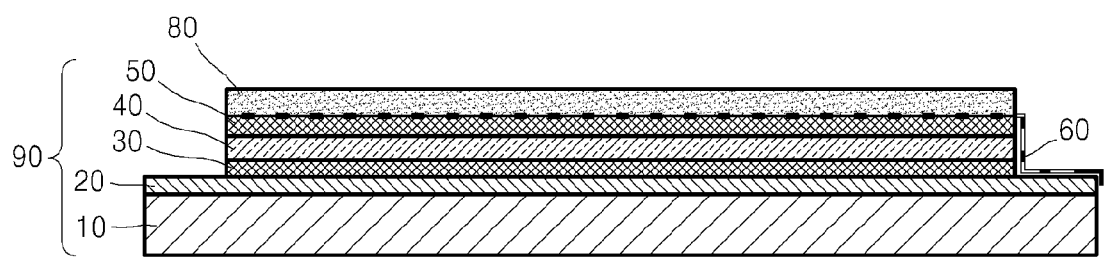

The second electrode collector 60 may be bonded to the second electrode material mixture layer 50 using various methods. FIGS. 2A, 3, and 4 are cross-sectional views of a secondary battery 100 for explaining a method of forming the second electrode collector 60 in the secondary battery 100 of FIG. 1, and FIG. 2B is a perspective, enlarged view of a portion A of FIG. 2A. According to a method of forming the second electrode collector 60, referring to FIGS. 2A and 2B, the second electrode collector 60 may be bonded to and buried in the second electrode material mixture layer 50 by thermal pressing. That is, when the second electrode collector 60 is disposed on the second electrode material mixture layer 50, which has been formed by printing and drying, and then pressure and heat are applied to the resultant structure, as illustrated in FIG. 2B, the second electrode collector 60 is buried in the second electrode material mixture layer 50, portions of a top surface of the second electrode material mixture layer 50 protrude through the openings 61 of the metallic mesh structure, and the second electrode material mixture layer 50 and the second electrode collector 60 overlap and are strongly bonded to each other.

According to a method of forming the second electrode collector 60, according to another embodiment of the present invention, referring to FIG. 3, a binder layer 80 may be further formed. That is, the second electrode collector 60 is disposed on the second electrode material mixture layer 50 and then, the binder layer 80 is formed thereon by printing and the binder layer 80 is dried. As a result, the binder layer 80 fills the openings 61 (shown in FIG. 2B) of the second electrode collector 60 and becomes solid, thereby strongly bonding the second electrode collector 60 to the second electrode material mixture layer 50.

According to another method of forming the second electrode collector 60, according to another embodiment of the present invention, referring to FIG. 4, a portion of the second electrode collector 60 is buried in the second electrode material mixture layer 50 by thermal printing and then the binder layer 80 may be printed on the resultant structure. As a result, the second electrode collector 60 and the second electrode material mixture layer 50 may be highly integrally formed as one body due to the bonding force caused by the thermal pressing and the bonding force of the binder layer 80.

Meanwhile, when the binder layer 80 includes a conductive agent, sufficient conductivity may be formed between the second electrode material mixture layer 50 and the second electrode collector 60.

If the second electrode collector 60 can be formed by printing, then a thinner laminate structure can be obtained. However, highly conductive metal is inappropriate for use in ink that is sintered at low temperature, and carbon materials that are appropriate for use in such ink have low conductivity. Accordingly, to form a collector, the thermal pressing process and the binder addition process described above are more appropriate than a printing process.

The encapsulation layer 70 covers the primary part 90 of the secondary battery 100, which constitutes integrally forming the substrate 10, the first electrode collector 20, the first electrode material mixture layer 30, the electrolyte layer 40, the second electrode material mixture layer 50, and the second electrode collector 60 as one body.

Due to the strongly bonded single-body structure of the substrate 10, the first electrode collector 20, the first electrode material mixture layer 30, the electrolyte layer 40, the second electrode material mixture layer 50, and the second electrode collector 60 layers are hardly separated from each other, even when bending stress is applied to the secondary battery 100. Accordingly, the secondary battery 100 has stable flexibility. In addition, a circuit connection structure is formed by printing when the first electrode material mixture layer 30, the electrolyte layer 40, and the second electrode material mixture layer 50 are formed by printing, and thus, a separate circuit connection process is not needed. As a result, a secondary battery 100 having stable flexibility can be easily manufactured.

Meanwhile, the thickness of the second electrode collector 60 may be 200 nm to 500 μm. If the thickness of the second electrode collector 60 is less than 200 nm, conductivity of the second electrode collector 60 is reduced. On the other hand, if the thickness of the second electrode collector 60 is greater than 500 μm, flexibility of the second electrode collector 60 is decreased. In addition, an aperture ratio of the second electrode collector 60 may be 1% to 99%. If the aperture ratio of the second electrode collector 60 is less than 1%, the bonding force is weak. On the other hand, if the aperture ratio of the second electrode collector 60 is greater than 99%, and too many openings 61 are formed, conductivity of the second electrode collector 60 is decreased. The pitch of the openings 61 may be 5 mm or less. That is, forming small, high-density openings is better than forming large, low-density openings, in terms of the bonding force.

The electrolyte layer 40 can also be referred to as a "separation layer." If 0.5 wt %-20 wt % of a binder material is added to the electrolyte layer 40, the electrolyte layer 40 may be more strongly bonded to the first electrode material mixture layer 30 and second electrode material mixture layer 50.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery, comprising:
   a substrate, and multiple layers on one surface thereof comprising, in sequence and in the following order:
   a first electrode collector on the substrate;
   a first electrode material mixture layer on first electrode collector;
   an electrolyte layer on the first electrode material mixture layer;
   a second electrode material mixture layer on the electrolyte; and
   a second electrode collector having a metallic mesh structure on the second electrode material mixture layer as one body, wherein
   the first electrode material mixture layer, the electrolyte layer, and the second electrode material mixture layer are sequentially formed on the first electrode collector in this order
   wherein the second electrode collector is buried in the second electrode material mixture layer using a thermal pressing process so that a portion of a top surface of the second electrode material mixture layer protrudes through openings of the second electrode collector and the second electrode collector and the second electrode material mixture layer are integrally formed as one body, and wherein the thickness of the second electrode collector is 200 nm to 100 μm, the aperture ratio of the second electrode collector is 1% to 99%, and an average pitch of openings of the second electrode collector is 5 mm or less.

2. A secondary battery comprising:
   a substrate, and multiple layers on one surface thereof comprising, in sequence and in the following order:
   a first electrode collector on the substrate;
   a first electrode material mixture layer on the first electrode collector;
   an electrolyte layer on the first electrode material mixture layer;
   a second electrode material mixture layer on the electrolyte; and
   a second electrode collector having a metallic mesh structure on the second electrode material mixture layer,
   a binder layer on the second electrode collector wherein
   the first electrode material mixture layer, the electrolyte layer, the second electrode material mixture layer, and the binder layer are sequentially formed on the first electrode collector in this order,
   wherein the binder layer exists in a solid state and fills openings of the second electrode collector to contact a top surface of the second electrode material mixture layer to make the second electrode collector and the second material mixture as one body, and
   wherein the thickness of the second electrode collector is 200 nm to 100 μm, the aperture ratio of the second electrode collector is 1% to 99%, and an average pitch of openings of the second electrode collector is 5 mm or less.

3. The secondary battery of claim 2, wherein the binder layer comprises a conductive agent.

4. The secondary battery of claim 2, wherein the second electrode collector comprises a metal selected from the group consisting of copper, stainless steel, titanium, and nickel.

5. The secondary battery of claim 2, wherein the electrolyte layer comprises 0.5 wt % to 20 wt % of a binder material.

6. The secondary battery of claim 2, further comprising an encapsulation layer formed on the binder layer.

7. The secondary battery of claim 1, wherein the second electrode collector comprises a metal selected from the group consisting of copper, stainless steel, titanium, and nickel.

8. The secondary battery of claim 1, wherein the electrolyte layer comprises 0.5 wt % to 20 wt % of a binder material.

9. The secondary battery of claim 1, further comprising an encapsulation layer formed on the second electrode collector.

* * * * *